(12) United States Patent
Tan

(10) Patent No.: US 8,167,384 B2
(45) Date of Patent: May 1, 2012

(54) UNDERCARRIAGE CLEANING MECHANISM AND METHOD OF PROVIDING THE SAME

(75) Inventor: Xiaoming Tan, Apex, NC (US)

(73) Assignee: Caterpillar Inc., Peoria, IL (US)

( * ) Notice: Subject to any disclaimer, the term of this patent is extended or adjusted under 35 U.S.C. 154(b) by 271 days.

(21) Appl. No.: 12/533,052

(22) Filed: Jul. 31, 2009

(65) Prior Publication Data

US 2011/0025122 A1 Feb. 3, 2011

(51) Int. Cl.
*B62D 55/088* (2006.01)

(52) U.S. Cl. .......................... 305/107; 305/100; 172/610

(58) Field of Classification Search .................. 305/100, 305/107, 108, 109, 110; 404/129; 280/855, 280/856; 172/606, 610
See application file for complete search history.

(56) References Cited

U.S. PATENT DOCUMENTS

| | | | | |
|---|---|---|---|---|
| 1,334,699 | A * | 3/1920 | Hill | 280/855 |
| 1,932,054 | A | 10/1933 | VonBrethorst | |
| 2,077,919 | A * | 4/1937 | Engstrom | 280/856 |
| 3,311,424 | A * | 3/1967 | Taylor | 305/110 |
| 3,367,726 | A * | 2/1968 | Tucker | 305/123 |
| 3,976,337 | A | 8/1976 | Vaughn | |
| 4,191,431 | A | 3/1980 | Roley et al. | |
| 4,605,264 | A | 8/1986 | Tonsor | |
| 4,830,439 | A | 5/1989 | Collins | |
| 5,226,703 | A * | 7/1993 | Norman | 305/110 |
| 5,293,948 | A | 3/1994 | Crabb | |
| 5,697,683 | A * | 12/1997 | Arulandu et al. | 305/110 |
| 5,725,292 | A | 3/1998 | Keedy et al. | |
| 5,762,408 | A | 6/1998 | Marsh | |
| 5,775,447 | A | 7/1998 | Dester et al. | |
| 5,863,104 | A * | 1/1999 | Satzler | 305/110 |
| 5,873,424 | A | 2/1999 | Gustafson | |
| 5,951,124 | A | 9/1999 | Hoffart | |
| 5,967,630 | A | 10/1999 | Sewell | |
| 6,019,443 | A | 2/2000 | Freeman | |
| 6,196,645 | B1 | 3/2001 | Bergstrom et al. | |
| 6,203,127 | B1 | 3/2001 | Chapman | |
| 6,267,453 | B1 | 7/2001 | Deland | |
| 6,371,578 | B1 | 4/2002 | Ferguson | |
| 6,517,173 | B1 | 2/2003 | Oberlander et al. | |
| 6,527,347 | B2 | 3/2003 | Brawley et al. | |
| 6,536,851 | B2 | 3/2003 | Grob et al. | |
| 6,578,934 | B2 * | 6/2003 | Ito et al. | 305/110 |
| 6,921,140 | B2 * | 7/2005 | Simons et al. | 305/107 |
| 7,380,628 | B2 * | 6/2008 | Bedard | 180/190 |
| 7,434,897 | B2 * | 10/2008 | Dom | 305/165 |
| 2001/0040058 | A1 | 11/2001 | Lemke et al. | |
| 2005/0046277 | A1 | 3/2005 | Simons et al. | |

FOREIGN PATENT DOCUMENTS

| | | |
|---|---|---|
| DE | 4239613 A1 * | 5/1994 |
| JP | 07251763 A * | 10/1995 |
| JP | 10081265 A * | 3/1998 |
| JP | 2000153785 A * | 6/2000 |
| JP | 2004017896 A * | 1/2004 |
| WO | 8302597 | 8/1983 |
| WO | 9407736 | 4/1994 |
| WO | 9423986 | 10/1994 |
| WO | 9825808 | 6/1998 |
| WO | 9914102 | 3/1999 |
| WO | 02051692 | 7/2002 |

* cited by examiner

*Primary Examiner* — Kip T Kotter

(74) *Attorney, Agent, or Firm* — Liell & McNeil

(57) ABSTRACT

A track roller frame cleaning mechanism is provided. The track roller frame cleaning mechanism includes a linkage configured to pivotally attach to a rotating track member and means for cleaning a surface of the track roller frame coupled to the linkage.

15 Claims, 3 Drawing Sheets

US 8,167,384 B2

UNDERCARRIAGE CLEANING MECHANISM AND METHOD OF PROVIDING THE SAME

TECHNICAL FIELD

The present disclosure generally relates an undercarriage cleaning mechanism and method of providing the undercarriage cleaning mechanism, and more particularly, to a mechanism for cleaning dirt and debris from a track frame of an undercarriage.

BACKGROUND

Construction, earthmoving and agricultural type machines are often equipped with endless track assemblies for support and propulsion of the machines. The track assembly provides better mobility on uneven ground and typically renders excellent traction while spreading the weight of the machine over a large area. Such machines are commonly operated in a variety of soil conditions. During operation, the movement of the track-type machine typically causes the track assemblies to pick up dirt and debris or any outlying material as it makes contact with the ground, only to have the material deposited on the track frame. As such, the material accumulates on the track frame and subsequently on the other components of the track-type machine. This may result in an increased machine weight, more friction forces between the moving components in the track assemblies and increased machine wear. Wear is generally caused as the accumulated material results in an abrasive action on the components of the machine. This impairs efficiency and produces premature wear of the machine. The machines have to be stopped to remove the accumulated material. Typically, the material needs to be manually removed from the track frame, which results in downtime and increases the maintenance cost of the machine. Also, if the accumulated material is not removed regularly, over a period of time it becomes hardened which increases wear and the difficulty in removing the same.

A number of manufacturers of track-driven machines introduced scraper arrangements to remove dirt and debris from the track assemblies. An example of such a solution is shown in U.S. Pat. No. 5,725,292 issued on Mar. 10, 1998, and assigned to Caterpillar Inc. In this example, a scraper assembly is provided, having a plurality of scraping portions to continuously engage with the contact surfaces of the idler of a track assembly to remove foreign material therefrom. The patent provides for removal of the debris from the track assembly and prevents the debris from remaining on the contact surfaces of the idler during their engagement with the track assembly. However, the disclosure does not provide for removal of the accumulated debris on the track frame while the machine is in operation.

The present disclosure seeks to overcome one or more of the problems as set forth above.

SUMMARY

In one aspect of the present disclosure, a track roller frame cleaning mechanism is provided. The track roller frame cleaning mechanism includes a linkage configured to pivotally attach to a rotating track member and means for cleaning a surface of the track roller frame coupled to the linkage.

In another aspect of the present disclosure, an undercarriage is provided. The undercarriage includes a track frame, a rotating track member and a slider. The rotating track member is rotatably attached to the track frame and the slider is coupled to the rotating track member and slidably disposed adjacent a surface of the track frame.

In a third aspect of the present disclosure, a method of providing an undercarriage is provided. The method includes the step of providing a track frame. The method also includes the step of rotatably attaching a rotating track member to the track frame. The method also includes the step of coupling a slider to the rotating track member and slidably disposing the slider adjacent a surface of the track frame.

DETAILED DESCRIPTION

According to various exemplary embodiments of the present disclosure, rotating movement of rotating track members of a machine is utilized to provide a reciprocating motion to a cleaning mechanism installed therein for preventing accumulation of dirt and debris on a surface of the machine, while the machine is in operation.

In one embodiment, rotating movement of rotating track members of a track-type machine is utilized to provide a reciprocating motion to a cleaning mechanism installed therein for preventing accumulation of dirt and debris on a surface of a track frame of the machine, while the machine is in operation. The term 'rotating track member' as used herein includes final drive drum, sprocket, rollers, bogie assemblies, carrier rollers, idlers or any other member of an undercarriage of the track-type machine that is rotatable about an axis and is adapted to propel a flexible track assembly or provide support thereof.

Figure 1:
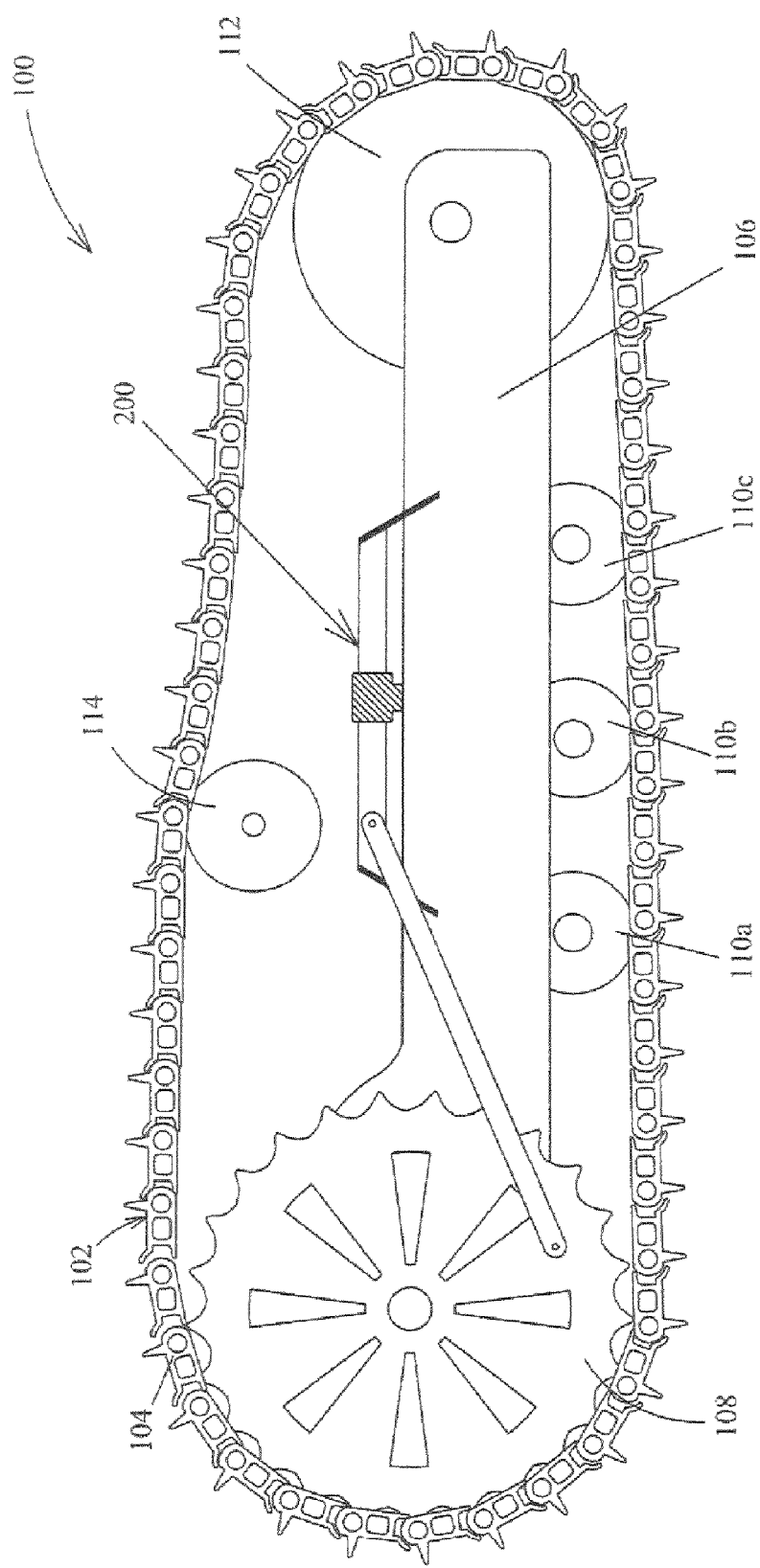
FIG. 1 is a diagrammatic side view of an undercarriage of a track-type machine according to one embodiment of the present disclosure.

Turning now to the drawings and referring first to FIG. 1 that illustrates an exemplary undercarriage 100 of a track-type machine (not shown) according to an exemplary embodiment of the present disclosure. The undercarriage 100 includes such as, but not limited to, a track assembly 102, a track frame 106, a final drive drum 108, such as, for example, a sprocket, a plurality of rollers 110a, 110b, 110c, at least one carrier roller 114 and an idler 112. The track assembly 102 includes transversely disposed track shoes 104 articulately linked together in side-by-side relationship by hinges or links. According to an exemplary embodiment, the idler 112 is situated on the rear side of the track frame 106 and the carrier roller 114 is located at the top section of the track frame 106. The rollers 110a, 110b, 110c are positioned below the track frame 106 between the idler 112 and the final drive drum 108. The track assembly 102 is entrained about and supported by the final drive drum 108, the idler 112, the carrier roller 114 and the rollers 110a, 110b, 110c. When rotated by the final drive drum 108, the track assembly 102 rotates about these components in rolling contact therewith and provides motive traction between the ground and the track-type machine and propels the track-type machine over a terrain. A mechanism 200 according to the present disclosure for cleaning the track frame 106 of the undercarriage 100 is secured to the track frame 106.

Figure 2:
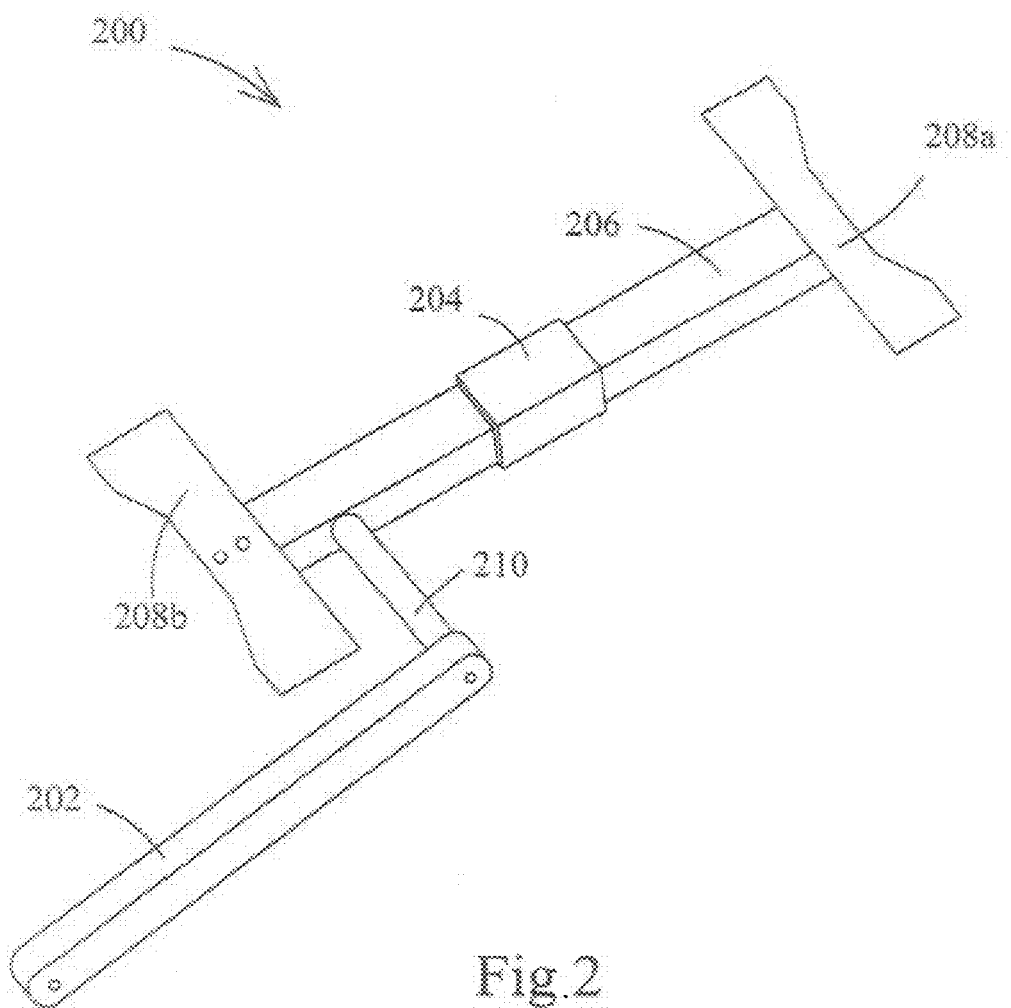
FIG. 2 is an isometric view of a cleaning mechanism according to one embodiment of the present disclosure.

FIG. 2 illustrates the mechanism 200 in detail. The mechanism 200 is shown as a four-bar slider-crank linkage, although other arrangements may be used. The mechanism 200 includes, but is not limited to, a connecting rod 202, a guide 204, a slider 206 and means for cleaning a surface of the track roller frame or cleaning elements 208a, 208b. The connecting rod 202 is pivotally attached to the slider 206. In one example, the connecting rod may be hinged to the slider 206 on one end through a spacer 210 and can be pivotally attached to a rotatable member of the undercarriage 100 on the other end. In one embodiment, the connecting rod 202 may be pivotally attached to a final drive drum 108 (as shown in FIG. 1) of the undercarriage 100. The connecting rod 202 may be mounted at a location offset from the rotation axis of the final drive drum 108. The slider 206 has cleaning elements 208a, 208b such as, but not limited to, a scrubber, a brush, a blade or any other suitable cleaning tool, attached thereto. In one example embodiment, a pair of cleaning elements may be attached at both the ends of the slider 206. In this embodiment, the slider 206 has a horizontally oriented centerline and the plane of the cleaning elements 208a, 208b form an angle with a plane perpendicular to the vertical centerline when the mechanism 200 is viewed in a vertically oriented plane. In one embodiment, the angle forms an acute angle. The slider 206 may be held by the guide 204 that in turn is attached to the track frame 106 (as shown in FIG. 1). The guide 204 steers the movement of the slider 206 along the track frame 106. In this example, when the track-type machine is running, the connecting rod 202 rotates with the final drive drum 108 of the undercarriage 100, providing a reciprocating movement to the slider 206 along the track frame 106. This in turn results in a reciprocating motion of the cleaning elements 208a, 208b that facilitates cleaning dirt, debris or any outlying material accumulated on the track frame 106.

Figure 3:
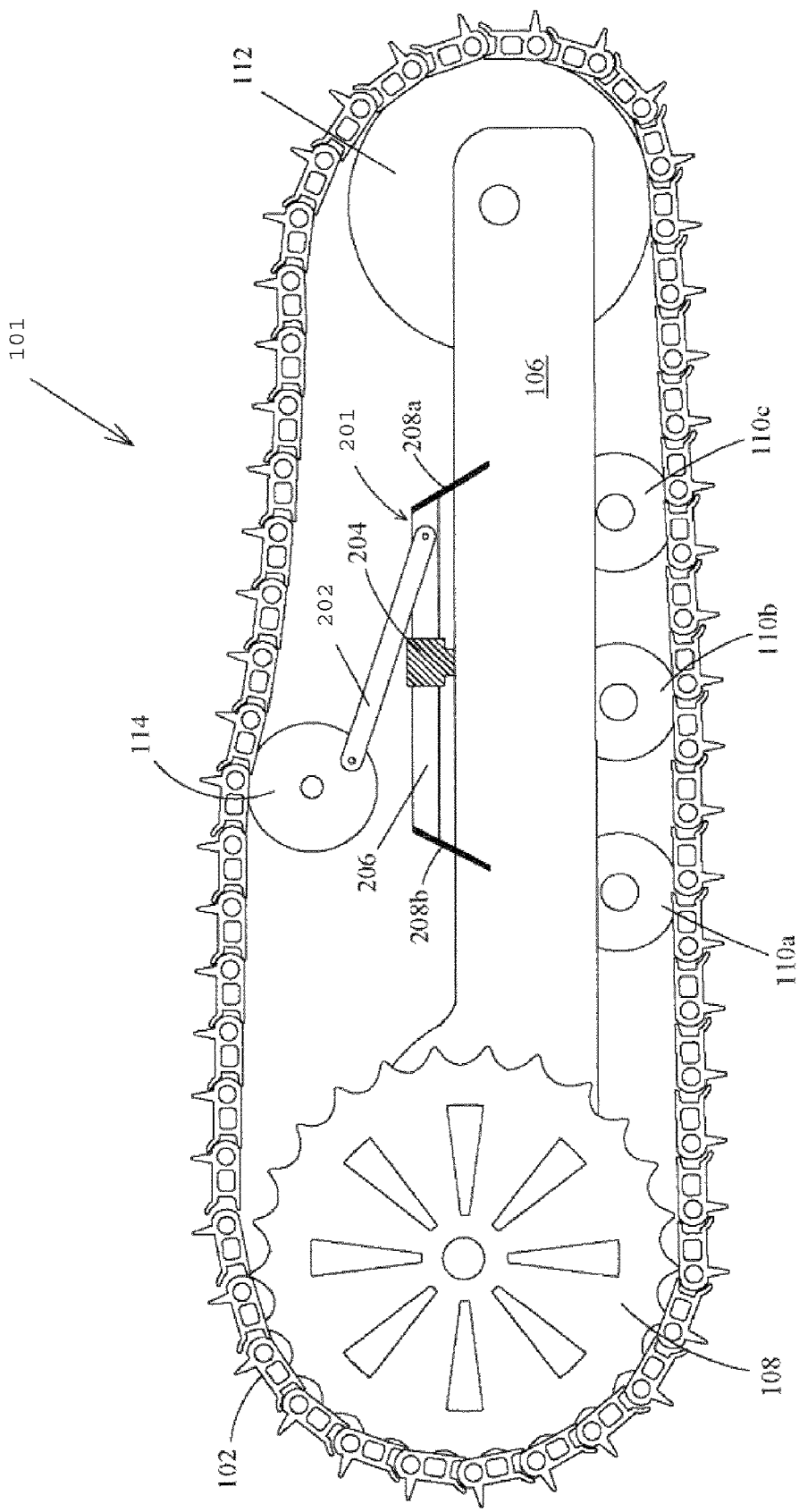
FIG. 3 is a diagrammatic side view of an undercarriage of a track-type machine according to another embodiment of the present disclosure.

FIG. 3 describes an undercarriage 101 having a mechanism 201 for cleaning the undercarriage 101 according to an alternate embodiment of the present disclosure. The undercarriage 101 includes elements such as, but not limited to, an endless track assembly 102, a track frame 106, a final drive drum 108, a plurality of rollers 110a, 110b, 110c, at least one carrier roller 114 and an idler 112. According to an exemplary embodiment, the idler 112 is situated at the rear part of the track frame 106 and the carrier roller 114 is located at the top section of the track frame 106. The rollers 110a, 110b, 110c are positioned below the track frame 106 between the idler 112 and the final drive drum 108. The track assembly 102 is entrained about and supported by the final drive drum 108, the idler 112, the carrier roller 114 and the rollers 110a, 110b, 110c. A mechanism 201 for cleaning the track frame 106 of the undercarriage 101 is secured to the track frame 106. The mechanism 201 includes, but is not limited to, a connecting rod 202, a guide 204, a slider 206 and a plurality of cleaning elements 208a, 208b. According to this embodiment, the connecting rod 202 is pivotally attached to the slider 206 on one end and to a carrier roller 114 on the other end. In one example, the connecting rod may be hinged to the slider 206 through a spacer 210. In one embodiment, the connecting rod is mounted at a location offset from the rotation axis of the carrier roller 114. The slider 206 has cleaning elements 208a, 208b such as, but not limited to, a scrubber, brush or any other suitable cleaning tool, attached thereto. In one example, a pair of cleaning elements 208a, 208b may be attached at both the ends of the slider 206. The slider 206 is held by the guide 204 that in turn secures to the track frame 106. The guide 204 steers the movement of the slider 206 along the track frame 106. During operation of the track-type machine, the connecting rod 202 rotates with the carrier roller 114 providing a reciprocating movement to the slider 206 along the track frame 106. The slider 206 in turn reciprocates the cleaning elements 208a, 208b thereby cleaning dirt, debris or any outlying material accumulated on the track frame 106 while the machine is running and moving.

Thus, the structural design according to the example embodiments of the present disclosure uses a four bar linkage mechanism in a slider-crank arrangement. The four bar linkage mechanism uses rotating movement of the machine's rotating track members to create a back and forth motion of a plurality of cleaning members attached thereto when the machine is in operation. This results in performing a self-cleaning task while the machine is running or moving. In other alternative embodiments, the connecting rod 202 may be configured to be pivotally attached to any other rotating component of the undercarriage 100 such as, but not limited, to the idler 112, depending on interference with the track frame 106.

INDUSTRIAL APPLICABILITY

The operation of the present disclosure is best described in relation to its use in earthmoving machines, particularly those machines performing a digging or loading function, such as an excavator, a backhoe loader or machines with endless track assemblies. In one embodiment, the machine is a track-type tractor.

As shown in FIG. 1, the track assembly 102 is driven by the final drive drum 108 that in turn rotates various other components such as the rollers 110a, 110b, 110c, the carrier roller 114 and the idler 112 along with the movement of the track assembly 102. The mechanism 200, as illustrated in FIG. 2, includes the connecting rod 202, the guide 204, the slider 206 and the cleaning elements 208a, 208b, installed on the track frame 106. The connecting rod 202 may be hinged to the slider 206 on one end through the spacer 210 and on the other end to a rotating track member such as, but not limited to, the final drive drum 108 (as shown in FIG. 1) or to the carrier roller 114 (as shown in FIG. 3). The slider 206 has cleaning elements 208a, 208b such as, but not limited to, scrubbers, brush or blade, or any other suitable cleaning tool, attached at both the ends. The slider 206 is held by the guide 204; the guide 204 in turn is attached to the track frame 106. The guide 204 steers the movement of the slider 206 along the track frame 106.

During operation as the undercarriage 100, 101 operates, the track shoes 104 of the track assembly 102 make contact with the ground and collect soil, dirt, debris and other outlying material as they move on the ground. The material collected by the track shoes 104 typically falls on the track frame 106 thereby resulting in accumulation of the material thereon. As the track assembly 102 operates, the final drive drum 108 or the carrier roller 114 drives the connecting rod 202. The connecting rod 202 in turn drives the slider 206 back and forth along the track frame 106 which in turn provides a reciprocating motion to the means for cleaning a surface of the track roller frame or cleaning elements 208a, 208b. The reciprocating action of the cleaning elements 208a, 208b along the track frame continuously remove the material from the track frame 106 thereby preventing accumulation of the material on the track frame 106.

Thus, the self-cleaning of the track frame 106 performed while the machine is running or moving leads to reduction in manual cleaning of the undercarriage. Further, it results in preventing accumulation of unwanted material in the undercarriage 100, 101 and clogging of the same over a period of time. Clogging of the material results in hardening of the same over a period of time and adds to the difficulty in removing the material manually, apart from contributing to the increase in the machine weight and the increase in friction forces between the moving components in the track assembly. The self-cleaning operation can aid in eliminating time-consuming cleaning tasks, reduce high maintenance costs and decrease the downtime associated with manual cleaning. Thus, apart from causing reduction in wear of the machine to a greater degree, the self cleaning operation can also aid in increasing efficiency and non-stop working hours of the machine.

While certain embodiments of the disclosure and methods of practicing the same have been illustrated and described herein, it is to be understood that the disclosure is not limited thereto but may be otherwise variously embodied and practiced within the scope of the following claims.

Other aspects, objects and advantages of this disclosure can be obtained from a study of the drawings, the disclosure, and the appended claims.

What is claimed is:

1. A track roller frame cleaning mechanism, comprising:
a linkage with a first end configured to pivotally attach to a rotating track member at a location offset from a rotation axis of the rotating track member;
a slider pivotally attached to a second end of the linkage and configured to reciprocate along a track roller frame in response to a rotating motion of the rotating track member;
at least one cleaning tool attached to the slider and configured to clean material off of the track roller frame responsive to reciprocating motion of the slider.

2. The track roller frame cleaning mechanism of claim 1, wherein the rotating track member includes at least one of a sprocket, a roller, a carrier roller or an idler.

3. A track roller frame cleaning mechanism, comprising:
a linkage configured to pivotally attach to a rotating track member; and
means for cleaning a surface of the track roller frame coupled to the linkage, wherein the linkage includes:
a connecting rod configured to pivotally attach to the rotating track member; and
a slider pivotally attached to the connecting rod and configured to reciprocate adjacent the surface of the track roller frame in response to a rotating motion of the rotating track member;
wherein the connecting rod has a first end portion and a second end portion, and the first end portion of the connecting rod is configured to pivotally attach to the rotating track member and the second end portion of the connecting rod is pivotally connected to the slider, and further comprising:
at least one cleaning element connected to the slider and configured to slide adjacent the surface of the track roller frame; and
a guide configured to operably connect to the track roller frame, the slider slidably connected to the guide and configured to reciprocally move in response to a rotary motion of the rotating track member.

4. The track roller frame cleaning mechanism of claim 3, wherein the means for cleaning a surface of the track roller frame includes at least one of a scrubber, a brush or a blade.

5. The track roller frame cleaning mechanism of claim 4, wherein the slider has a horizontally oriented centerline when the track roller frame cleaning mechanism is viewed in a vertically oriented plane, and the means for cleaning a surface of the track roller frame forms an acute angle with a plane perpendicular to the horizontally oriented centerline.

6. A track roller frame cleaning mechanism, comprising:
a linkage configured to pivotally attach to a rotating track member; and
means for cleaning a surface of the track roller frame coupled to the linkage, wherein the linkage includes:
a connecting rod configured to pivotally attach to the rotating track member; and
a slider pivotally attached to the connecting rod and configured to reciprocate adjacent the surface of the track roller frame in response to a rotating motion of the rotating track member; and
wherein the slider includes a first and a second end, and the means for cleaning a surface of the track roller frame includes a first cleaning element and a second cleaning element, the first cleaning element attached to the slider at the first end and the second cleaning element connected to the slider at the second end.

7. An undercarriage comprising:
a track frame;
a rotating track member rotatably attached to the track frame;
a slider coupled to the rotating track member at a location offset from a rotation axis of the rotating track number and slidably disposed adjacent a surface of the track frame;
a connecting rod pivotally attached to the rotating track member and to the slider;
wherein the slider reciprocates adjacent the surface of the track roller frame in response to a rotating motion of the rotating track member; and
a guide operably connected to the track frame, the slider slidably connected to the guide.

8. The undercarriage of claim 7, wherein the rotating track member is at least one of a sprocket, a roller, a carrier roller or an idler.

9. An undercarriage comprising:
a track frame;
a rotating track member rotatably attached to the track frame;
a slider coupled to the rotating track member at a location offset from a rotation axis of the rotating track member and slidably disposed adjacent a surface of the track frame;
a connecting rod pivotally attached to the rotating track member and to the slider, and
wherein the slider reciprocates adjacent the surface of the track roller frame in response to a rotating motion of the rotating track member;
wherein the slider has a first and a second end, the undercarriage further comprising:
a first and a second cleaning element; and
the first cleaning element connected to the first end of the slider and the second end of the slider connected to the second cleaning element.

10. The undercarriage of claim 9, wherein the first and second cleaning elements includes at least one of a scrubber, a brush or a blade.

11. A method of providing an undercarriage, comprising:
providing a track frame;
rotatably attaching a rotating track member to the track frame; and
coupling a slider to the rotating track member at a location offset from a rotation axis of the rotating track member and slidably disposing the slider adjacent a surface of the track frame;
wherein the step of coupling the slider to the rotating track member includes:

pivotally attaching a connecting rod to the rotating track member; and pivotally attaching the slider to the connecting rod and slidably disposing the slider adjacent the surface of the track frame;

wherein the slider reciprocates adjacent the surface of the track roller frame in response to a rotating motion of the rotating track member;

operably connecting a guide to the track frame; and slidably connecting the slider to the guide.

12. The method of claim 11, wherein the rotating track member is at least one of a sprocket, a roller, a carrier roller or an idler.

13. A method of providing an undercarriage, comprising:

providing a track frame;

rotatably attaching a rotating track member to the track frame;

coupling a slider to the rotating track member at a location offset from a rotation axis of the rotating track member and slidably disposing the slider adjacent a surface of the track frame;

wherein the step of coupling the slider to the rotating track member includes:

pivotally attaching a connecting rod to the rotating track member; and pivotally attaching the slider to the connecting rod and slidably disposing the slider adjacent the surface of the track frame;

wherein the slider reciprocates adjacent the surface of the track roller frame in response to a rotating motion of the rotating track member;

wherein the slider has a first end and a second end, and further comprising:

providing a first cleaning element and a second cleaning element;

connecting the first cleaning element to the first end of the slider; and connecting the second end of the slider to the second cleaning element.

14. The method of claim 13, wherein the first cleaning element includes at least one of a scrubber, a brush or a blade.

15. The method of claim 13, wherein the second cleaning element includes at least one of a scrubber, a brush or a blade.

\* \* \* \* \*